(12) United States Patent
Chada et al.

(10) Patent No.: US 12,197,275 B2
(45) Date of Patent: Jan. 14, 2025

(54) SYSTEMS AND METHODS FOR PREDICTIVE SIGNALING ANALYTICS IN HIGH-SPEED DATA LINKS

(71) Applicant: Dell Products, L.P., Round Rock, TX (US)

(72) Inventors: Arun Chada, Pflugerville, TX (US); Bhyrav M. Mutnury, Austin, TX (US); Bhavesh Govindbhai Patel, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 161 days.

(21) Appl. No.: 17/813,849

(22) Filed: Jul. 20, 2022

(65) Prior Publication Data
US 2024/0028448 A1    Jan. 25, 2024

(51) Int. Cl.
*G06F 11/07*    (2006.01)
*G06F 11/30*    (2006.01)
*G06F 13/42*    (2006.01)

(52) U.S. Cl.
CPC ...... *G06F 11/0793* (2013.01); *G06F 11/3027* (2013.01); *G06F 13/4221* (2013.01)

(58) Field of Classification Search
CPC ............ G06F 11/0793; G06F 11/3027; G06F 13/4221
See application file for complete search history.

(56) References Cited

U.S. PATENT DOCUMENTS 11,190,597 B1 * 11/2021 Suto ........................ H04L 67/10
2023/0289270 A1 * 9/2023 Caraccio ............. G06F 11/2221

* cited by examiner

*Primary Examiner* — Jigar P Patel
(74) *Attorney, Agent, or Firm* — Fogarty LLP

(57) ABSTRACT

Systems and methods provide management of PCIe bandwidth within an IHS (Information Handling System) through predictive evaluation of signaling degradation in PCIe lanes of the IHS. Upon initialization of the IHS, a DPU (Data Processing Unit) generates baseline signal integrity measurements for PCIe links supported by a PCIe interface of the DPU. A signaling analytic model operated by the DPU is calibrated using the baseline signal integrity measurements. A signal degradation prediction is generated by the signaling analytics model. When the signal degradation prediction is confirmed versus observed degradation in the PCIe interface, use of the signaling analytics model is activated. The activated signaling analytics module is then utilized to predict a signaling degradation in a connection supported by the PCIe interface of the DPU. In response to the prediction by the activated signaling analytics model, a corrective operation is initiated in order to prevent the predicted signaling degradation.

20 Claims, 5 Drawing Sheets

SYSTEMS AND METHODS FOR PREDICTIVE SIGNALING ANALYTICS IN HIGH-SPEED DATA LINKS

FIELD

The present disclosure relates generally to Information Handling Systems (IHSs), and relates more particularly to managing signaling integrity in high-speed data links available within an IHS.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may utilize various protocols and standards for communicating with internal components of the IHS and with the external components and systems that may be connected to an IHS. PCIe (Peripheral Component Interconnect Express) is a high-bandwidth input/output (I/O) interface or data bus that is used by IHSs as a communication mechanism. Because of its high-speed data transmission capabilities, PCIe is used as an interface for communicating with various different types of components, including graphics cards, network cards, removable processor cores, streaming multimedia devices, USB cards and certain types of storage devices. PCIe may also be used for establishing direct high-speed connections between IHSs that are in close proximity to each other and are configured as members of a computing cluster, such as within an enterprise data center implementation. PCIe connections may also be used for establishing high-speed data connections in support of specialized configurations of IHSs, such as in support of artificial intelligence and machine learning systems.

PCIe devices typically interface with one or more PCIe buses provided by an IHS. A PCIe bus connection is logically and physically organized into data pathways referred to as lanes, where each lane consists of two differential pairs of signaling wires. One of the differential pairs of each lane is used for transmission of PCIe data and the other differential pair is used for receiving PCIe data. In server applications, common PCIe connections include eight lane (x8), sixteen lane (x16) and thirty-two lane (x32) connections. Various other bandwidth PCIe connections may be supported by an IHS based on the types of PCIe devices and components that are supported by the IHS. PCIe supports the grouping of multiple lanes into higher bandwidth PCIe connections that may be referred to as links. The greater the number of lanes within link, the higher the bandwidth of the link. For instance, within an x32 PCIe bus, the lanes may be grouped into four x8 bandwidth PCIe links, two x16 bandwidth PCIe links, etc.

Each PCIe link may be configured to operate at multiple different speeds, with lower transmission speed PCIe links being utilized to mitigate the effects of errors that may be observed in higher transmission speed PCIe links. An IHS may include one or more SSDs (Solid State Devices) that may be used as storage resources available for use by components of the IHS. The NVMe (Non-Volatile Memory Express) protocol specifies interfaces for accessing SSDs via PCIe connections, thus improving the ability to perform I/O operations on multiple SSDs in parallel and at high-bandwidths. Accessing multiple SSDs in parallel at high transmission speeds can result in degradation of the integrity of the signals used to transmit PCIe communications to and from the SSDs. When signal integrity for such PCIe communications cannot be improved, transmission speeds for a PCIe link may be lowered, thus restricting the performance of algorithms utilizing the PCIe link.

SUMMARY

In various embodiments, IHSs (Information Handling Systems) may include: one or more CPUs utilizing one or more PCIe (Peripheral Component Interconnect Express) buses that connect to a plurality of PCIe devices; the plurality of PCIe devices; a data processing unit (DPU) comprising: one or more DPU processor cores; a PCIe interface connecting the data processing unit to the one or more CPUs and to one or more of the plurality of PCIe devices; one or more memory devices storing computer-readable instructions that, upon execution by the one or more DPU processor cores, cause a signaling analytics program to: upon initialization of the IHS, generate baseline signal integrity measurements; calibrate a signaling analytic model using the baseline signal integrity measurements; generate a signal degradation prediction using the signaling analytics model; when the signal degradation prediction is confirmed, activate use of the signaling analytics model; utilize the activated signaling analytics module to predict a signaling degradation in a connection supported by the PCIe interface; and initiate a corrective operation to prevent the predicted signaling degradation.

Some IHS embodiments may also include: a remote access controller configured to collect signal integrity data from one or more of the plurality of PCIe devices, wherein the signal integrity data collected by the remote access controller is used to confirm the signal degradation prediction. In some IHS embodiments, the signal integrity data is collected from the one or more PCIe devices using sideband management connections between the remote access controller and the one or more PCIe devices. In some IHS embodiments, the signaling analytics model is also activated when the signal degradation prediction is improving relative to prior predictions and the signal integrity data collected by the remote access controller indicates a drift in signal integrity. In some IHS embodiments, the drift in signal integrity is measured based on detected drift in an eye chart of a signal supported by the PCIe interface. In some IHS embodiments, the corrective operation initiated to prevent the predicted signaling degradation comprises initiating a retraining of the signal supported by the PCIe interface. In some IHS embodiments, the predicted signaling degradation comprises a degradation caused by a change to a first of the PCIe devices of the IHS. In some IHS embodiments, the first PCIe device coupled to the IHS comprises an SSD (Solid State Drive). In some IHS embodiments, the predicted signaling degradation is caused by the SSD entering a sleep state. Some IHS embodiments may further include a PCIe switch connecting the DPU to the one or more CPUs, wherein the signal degradation prediction is confirmed based on signal integrity data collected by the PCIe switch. In some IHS embodiments, the corrective operation is initiated by the PCIe interface. In some IHS embodiments, the corrective operation is initiated using the sideband management connections between the remote access controller and the one or more PCIe devices.

In additional embodiments, methods provide management of PCIe (Peripheral Component Interconnect Express) bandwidth of a DPU (Data Processing Unit) of an IHS (Information Handling System). The methods may include: upon initialization of the IHS, generating baseline signal integrity measurements of one or more connections supported a PCIe interface of the DPU; calibrating a signaling analytic model using the baseline signal integrity measurements; generating a signal degradation prediction using the signaling analytics model; when the signal degradation prediction is confirmed, activating use of the signaling analytics model; utilizing the activated signaling analytics module to predict a signaling degradation in a connection supported by the PCIe interface of the DPU; and initiating a corrective operation to prevent the predicted signaling degradation.

In some method embodiments, the signaling analytics model is also activated when the signal degradation prediction is improving relative to prior predictions and collected signal integrity data indicates a drift in signal integrity. In some method embodiments, the drift is detected based on a detected drift in an eye chart of a signal supported by the PCIe interface. In some method embodiments, the prediction is confirmed based on an eye chart of a signal supported by the PCIe interface. In some method embodiments, the predicted signaling degradation comprises a degradation caused by a change to a PCIe device coupled to the IHS.

In additional embodiments, computer-readable storage devices of DPUs (data processing units) include instructions stored thereon for management of PCIe (Peripheral Component Interconnect Express) bandwidth of an IHS (Information Hand ling System) in which a DPU is installed. Execution of the instructions by one or more processors of the DPU causes the processors of the DPU to: upon initialization of the IHS, generate baseline signal integrity measurements of one or more connections supported a PCIe interface of the DPU; calibrate a signaling analytic model using the baseline signal integrity measurements; generate a signal degradation prediction using the signaling analytics model; when the signal degradation prediction is confirmed, activate use of the signaling analytics model; utilize the activated signaling analytics module to predict a signaling degradation in a connection supported by the PCIe interface of the DPU; and initiate a corrective operation to prevent the predicted signaling degradation.

In some DPU storage device embodiments, the signaling analytics model is also activated, when the signal degradation prediction is improving relative to prior predictions and collected signal integrity data indicates a drift in signal integrity. In some method embodiments, the predicted signaling degradation comprises a degradation caused by a change to a PCIe device coupled to the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
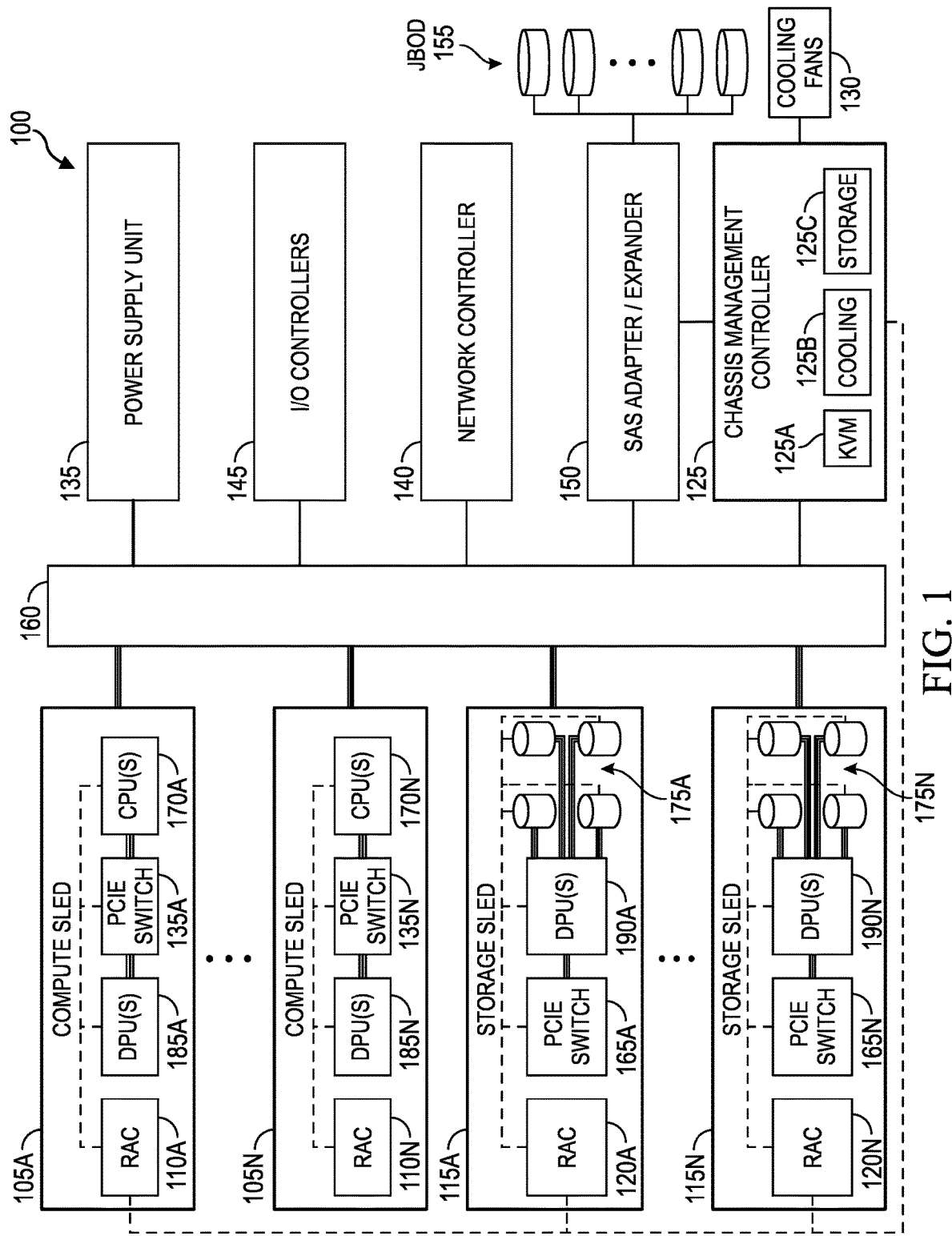
FIG. 1 is a diagram illustrating certain components of a chassis configured, according to some embodiments, for managing signaling integrity in high-speed data links available within IHSs installed in the chassis.

FIG. 1 is a block diagram illustrating certain components of a chassis 100 comprising one or more compute sleds 105a-n and one or more storage sleds 115a-n that may be configured to implement the systems and methods described herein for improving signaling integrity in high-speed data links available within IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in many cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as some computational tasks utilized in some artificial intelligence systems, may utilize computational and/or storage resources that are shared within an IHS, within a chassis 100 and/or within a set of IHSs that may be spread across multiple chassis of a data center. In some artificial intelligence systems, processing tasks may be allocated for processing to a specific processing unit of an IHS, such as to a DPU 185a-n, 190a-n that is a supplementary processor that operates separate from the one or more main CPUs of an IHS. Implementing such artificial intelligence systems while spanning processing components of one or more IHSs is aided by high-speed data links between these processing components, such as the illustrated PCIe connections that may be used in forming a PCIe fabric that is implemented by PCIe switches 135a-n, 165a-n installed in these IHSs 105a-n, 115a-n. These high-speed data links may support algorithm implementations that span multiple processing, networking and storage components of an IHS and/or chassis 100 through the use of high-speed PCIe communications that provide data signaling pathways between these components. Due to such complex signaling environment and the high signaling speeds supported by PCIe, the connections used to transmit PCIe communications between components of an IHS can suffer from various forms of signal degradation.

Chassis 100 may be installed within a rack structure that provides at least a portion of the cooling utilized by the Hs 105a-n, 115a-n installed in chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
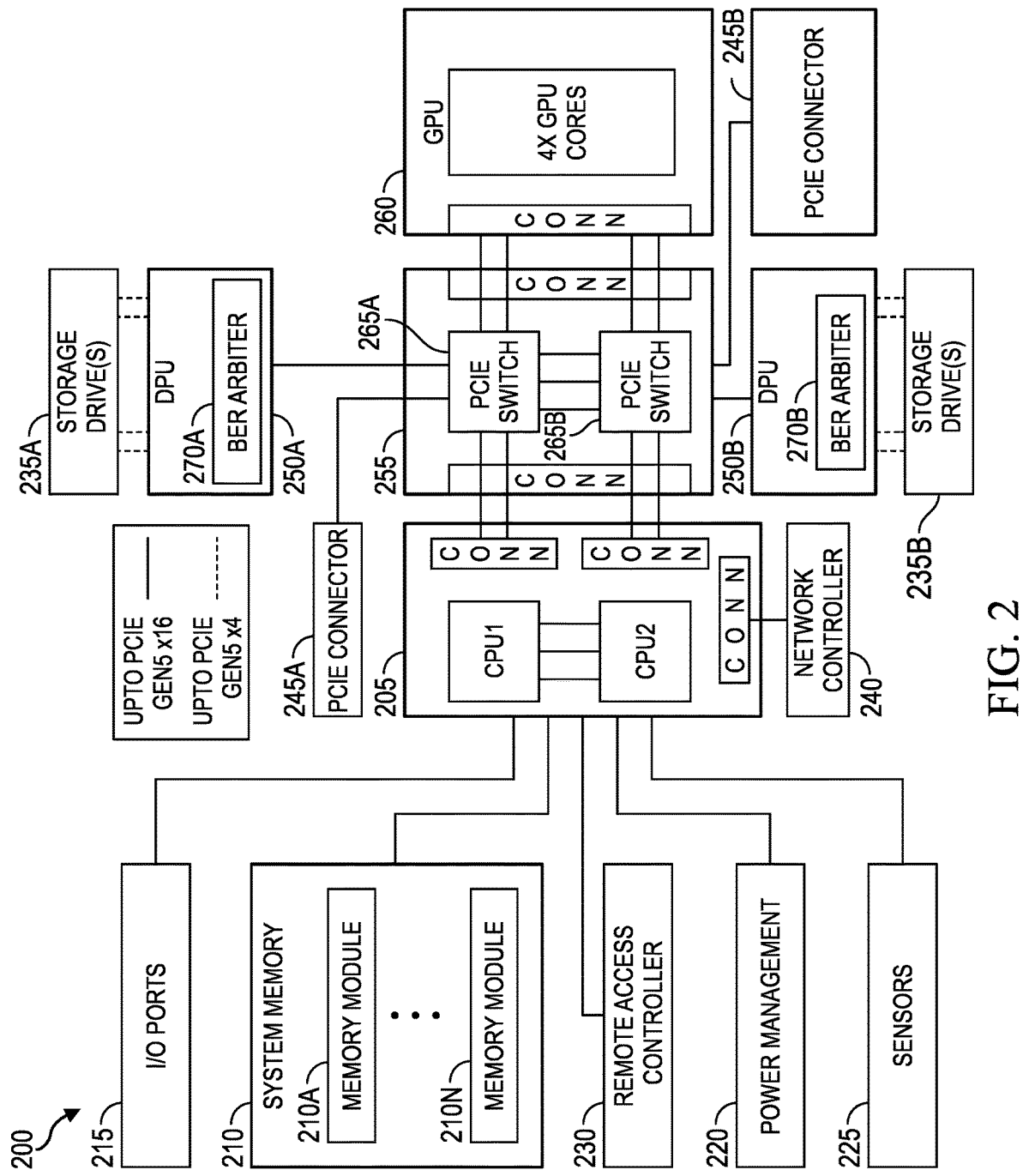
FIG. 2 is a diagram illustrating certain components of an IHS configured, according to some embodiments, for managing signaling integrity in high-speed data links available within the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services provided using such computing capabilities are typically provided as high-availability systems that operate with minimum downtime. As described in additional detail with regard to FIG. 2, sleds 105a-n, 115a-n may be configured for general-purpose computing or may be optimized for specific computing tasks.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n. In support of these monitoring and management functions, remote access controllers 110a-n may utilize both in-band and sideband (i.e., out-of-band) communications with various components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n that utilize sideband bus connections with various internal components of the respective sleds 105a-n, 115a-n. As described in additional detail below, remote access controller 110a-n, 120a-n may be instrumented to collect high-speed signal integrity telemetry data and system status information from various managed components of an IHS, such as from the PCIe switches 135a-n, 165a-n, DPUs 135a-n, 190a-n and storage devices 175a-n that utilize PCIe high-speed signaling in the respective IHSs, such as in the implementation of machine learning algorithms that span these managed components of chassis 100.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, accessed through a PCIe switch 165a-n by a respective DPU 190a-n of the IHS, where use of the DPU in this manner provides low-latency and high-bandwidth access to the SSDs. Use of NVMe supported by PCIe couplings further supports high-bandwidth and low-latency use of multiple SSDs in parallel. The immense data storage and retrieval capabilities provided by such implementations are best harnessed by offloading storage operations to a DPU 190a-n, and thus without burdening the main CPU of an IHS.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for improving signaling integrity in high-speed data links available within an IHS 200. It should be appreciated that although the embodiments described herein may describe an IHS that is a compute sled or similar computing component that may be deployed within the bays of a chassis, other embodiments may be utilized with other types of IHSs that may also support management of data-link bandwidth that is available within the IHS. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately assigned computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated that is located on the same die as the CPU 205. Each memory controller may be configured to manage the transfer of data to and from a system memory 210 of the IHS, in some cases using a high-speed memory interface. The system memory 210 is coupled to CPUs 205 via one or more memory buses that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses 205a. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of busses. For instance, CPUs 205 may also be coupled to a power management unit 220 that may interface with a power system of the chassis 100 in which IHS 200 may be installed. CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 230 that supports remote management of IHS 200 and of various internal components of IHS 200. In certain embodiments, remote access controller 230 may operate from a different power plane from the CPUs 205 and from other components of IHS 200, thus allowing the remote access controller 230 to operate, and management tasks to proceed, while the processing cores of IHS 200 are powered off. As described, various functions provided by the BIOS, including launching the operating system of the IHS 200, may be implemented by the remote access controller 230. In some embodiments, the remote access controller 230 may perform various functions to verify the integrity of the IHS 200 and its hardware components prior to initialization of the operating system of IHS 200 (i.e., in a bare-metal state).

Remote access controller 230 may include a service processor, or specialized microcontroller, that operates management software that provides remote monitoring and administration of IHS 200. Remote access controller 230 may be installed on the motherboard, backplane, midplane, etc. of IHS 200, or may be coupled to IHS 200 via an expansion slot connector provided the IHS. In support of remote monitoring functions, remote access controller 230 may include a dedicated network adapter that may support management connections by remote access controller 230 using wired and/or wireless network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 230 may support monitoring and administration of various managed devices of an IHS via a sideband bus interface 230a. For instance, messages utilized in device management may be transmitted using I2C sideband bus 230a connections that may be established with each of the managed devices. These managed devices of IHS 200, such as specialized hardware, network controllers 240, sensors 225, and storage drives 235a-b, may be connected to the CPUs 205 via in-line buses, such as the described PCIe switch fabric, that is separate from the I2C sideband bus 230a connections used by the remote access controller 230 for device management. As described in additional detail with regard to FIGS. 3 and 4, remote access controller 230 may utilize this sideband bus 230a in collecting signal integrity data and device status information from managed devices of IHS 200, such as PCIe switches 265a-b, storage devices 235a-b, DPU 250a-b, where this signal integrity data is used by embodiments in predictively identifying degradation of high-speed signaling in IHS 200, and in initiating corrective action to avoid the predicted degradation.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., connection of a motherboard, backplane, midplane, etc.) of IHS 200. In some embodiments, network controller 240 may support high-bandwidth network operations through a PCIe coupling accessible by the chipsets of CPUs 205.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. In some instances, the switching logic of PCIe switches 265a-b that is used to route PCIe transmissions are connected to CPUs 205 via upstream ports and are connected to PCIe devices via downstream ports that multiply the number of upstream ports, thus distributing the available PCIe bandwidth of the upstream ports to the downstream ports. The PCIe bandwidth that is available in each of these downstream ports may be configured through allocating one or more PCIe lanes to a specific port and also by specifying a transmission speed for the port, such as 16 Gbps, 32 Gbps, 64 Gbps. As described in additional detail below, PCIe switches 265a-b may also implement error reporting functions, including the generation of error reports that specify failures in TLP processing for the PCIe connections being supported by the PCIe switches 265a-b. Such errors may provide indications of degraded signal integrity in the high-speed data paths supported by the PCIe switches 265a-b. As the complexity of these PCIe fabric that supports these connections increases, degradations in signal integrity also tend to increase, and the causes of such degradations are increasingly difficult to identify in a systematic manner. The prevalence of signal degradations and the difficulty of diagnosing the causes of the degradations only increase further as signal speeds increase in these data paths. Accordingly, signal integrity degradations that cannot be readily diagnosed are increasingly common in high-performance computing, such as computing solutions implemented using IHS 200.

As illustrated, PCIe switch 265a is coupled via PCIe connections to a DPU 250a that may be a connected to the IHS via a removeable card that couples to a PCIe connector of the IHS. Also as illustrated, rather than utilize a PCIe switch, DPU 250b is coupled via a PCIe connection directly to CPUs 205. PCIe switch 265b may also be connected to the IHS via a removeable card that couples to a PCIe connector of the IHS. Each of the DPUs 250a-b includes a programmable processor that can be configured for offloading functions from CPUs 205. In some instances, DPUs 250a-b may be programmed to offload functions that support the operation of devices or systems that are coupled to IHS 200, thus sparing CPUs 205 from a significant number of interrupts required to support these devices coupled to the IHS and gaining efficiency through the use of specialized implementations of these offloaded functions that can be achieved using the programmable logic of the DPUs 250a-b.

In some embodiments, DPUs 250a-b may include a plurality of programmable processing cores and/or hardware accelerators, that may be used to implement functions used to support devices coupled to the IHS 200. In the illustrated embodiment, DPUs 250a-b implement functions used to support storage drives 235a-b, such as SSDs (solid-state drives). For instance, DPUs 250a-b may implement processing of PCIe communications with SSD storage drives 235a-b that support NVMe protocols that support the use of high-bandwidth PCIe connections with SSDs. DPUs 250a-b may also include one more memory devices that may be used to store program instructions executed by the processing cores and/or used to support the operation of SSD storage drives 235a-b, such as in implementing cache memories and buffers utilized in support of the storage drives.

In some embodiments, the processing cores of DPUs 250a-b include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Each core of the DPUs 250a-b may be programmed to perform functions that support operation of SSD storage drives 235a-b, such as processing of PCIe packets that are transmitted in executing read, write and other I/O operations on these storage drives 235a-b. In some embodiments, DPUs 250a-b may be implemented through integrated circuits mounted on a printed circuit board (e.g., a replaceable card) that is coupled to the motherboard, backplane, midplane or other printed circuit board of the IHS. In some embodiments, PCIe busses may be utilized both in the couplings connecting DPUs 250a-b to the IHS 200 and in the couplings connecting the DPUs 250a-b to the SSD storage drives 235a-b. In other embodiments, DPUs 250a-b may implement operations in support of other types of devices and may similarly support high-bandwidth PCIe connections with these devices. For instance, in various embodiments, DPUs 250a-b may support high-bandwidth connections, such as PCIe connections, with networking devices in implementing functions of a network switch, compression and codec functions, virtualization operations or cryptographic functions.

As indicated in FIG. 2, DPUs 250a-b each include a signaling analytics program 270a-b. As describe in further detail below, the signaling analytics implemented by the DPUs 250a-b is configured to monitor and predictively analyze degradations in signaling integrity in the high-speed PCIe connections utilized by the DPUs 25a-b in support of the SSD storage drives 235a-b, or any other PCIe devices coupled to the DPUs. In some embodiments, signaling analytics 270a-b may be invoked upon initialization of IHS 200 and used to generate reference measurements of the signal integrity in the upstream and downstream PCIe ports of the PCIe interface of DPUs 250a-b. In some embodiments, the signal integrity measurements utilized by the signaling analytics program 270a-b are collected directly by the DPUs 250a-b, such as by measurements undertaken by the PCIe interface of the DPUs 250a-b. In some embodiments, the signal integrity measurements utilized by the signaling analytics program 270a-b may additionally or alternatively include measurements collected by remote access controller 230a using sideband signaling pathways 230a with PCIe devices in the IHS.

Using the collected baseline signal integrity measurements, the signaling analytics program 270a-b calibrates a machine learning model for use in predicting degradations in the signal integrity of the PCIe links supported by the DPUs 250a-b. Once calibrated, the signaling analytics program 270a-b may begin periodic collection of signal integrity measurements and various system parameters that may be indicative of degradations in signal integrity. For instance, using monitoring capabilities supported by remote access controller 230, signaling analytics program 270a-b may analyze system logs, temperature data collected by sensors 225 and/or device status information (e.g., removal of new SSD storage drive 235b, a sleep state of a SSD storage drive, a reset state of a GPU 260, a new PCIe device coupled to a PCIe switch 265a-b). Using this collected system data and the current signal integrity conditions as inputs, the signaling analytics program 270a-b may utilize a machine learning model to predict degradations in one or more of the PCIe connections being supported by the respective DPUs 250a-b. As described in addition detail below, such a machine learning model for predicting PCIe signal degradation may be activated according to embodiments once establishing that the model is able to correctly predict changes in a PCIe connection.

In addition to supporting high-bandwidth PCIe couplings with CPUs 205, as illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200.

Rather than being used for rendering graphics data for display, GPUs 260 may instead be used in processing of graphics data, such as in support of artificial intelligence and machine learning systems. For instance, GPUs 260 may be used in processing graphical inputs from video and/or camera feeds being utilized in support of machine vision systems. In some instances, GPUs 260 may process streaming video data in support of on-the-fly machine vision evaluation of live captured video, where captured video data and data resulting from the processing of the video data by the GPUs 260 may be stored to SSD storage drives 235*a-b* via PCIe lanes implemented by PCIe switches 265*a-b*. In other instances, GPUs 260 may be utilized in offline processing of video data, such as for training of machine learning systems. In such instances, the video data may be retrieved from SSD storage drives 235*a-b* and transmitted to GPUs 260 for processing, also via PCIe lanes implemented by PCIe switches 265*a-b*. Embodiments may additionally or alternatively used in the offloading and acceleration of various types of computational workloads other than in the processing of video data.

As illustrated in FIG. 2, PCIe switches 265*a-b* may support PCIe connections in addition to those utilized by GPUs 260 and DPUs 250*a-b*, where these connections may include PCIe links of one or more lanes. For instance, PCIe connectors 245*a-b* supported by printed circuit board of IHS 200 may allow various other systems and devices to be coupled to IHS. Through couplings to PCIe connectors 245*a-b*, a variety of data storage devices, graphics processors and network interface cards may be coupled to IHS 200.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
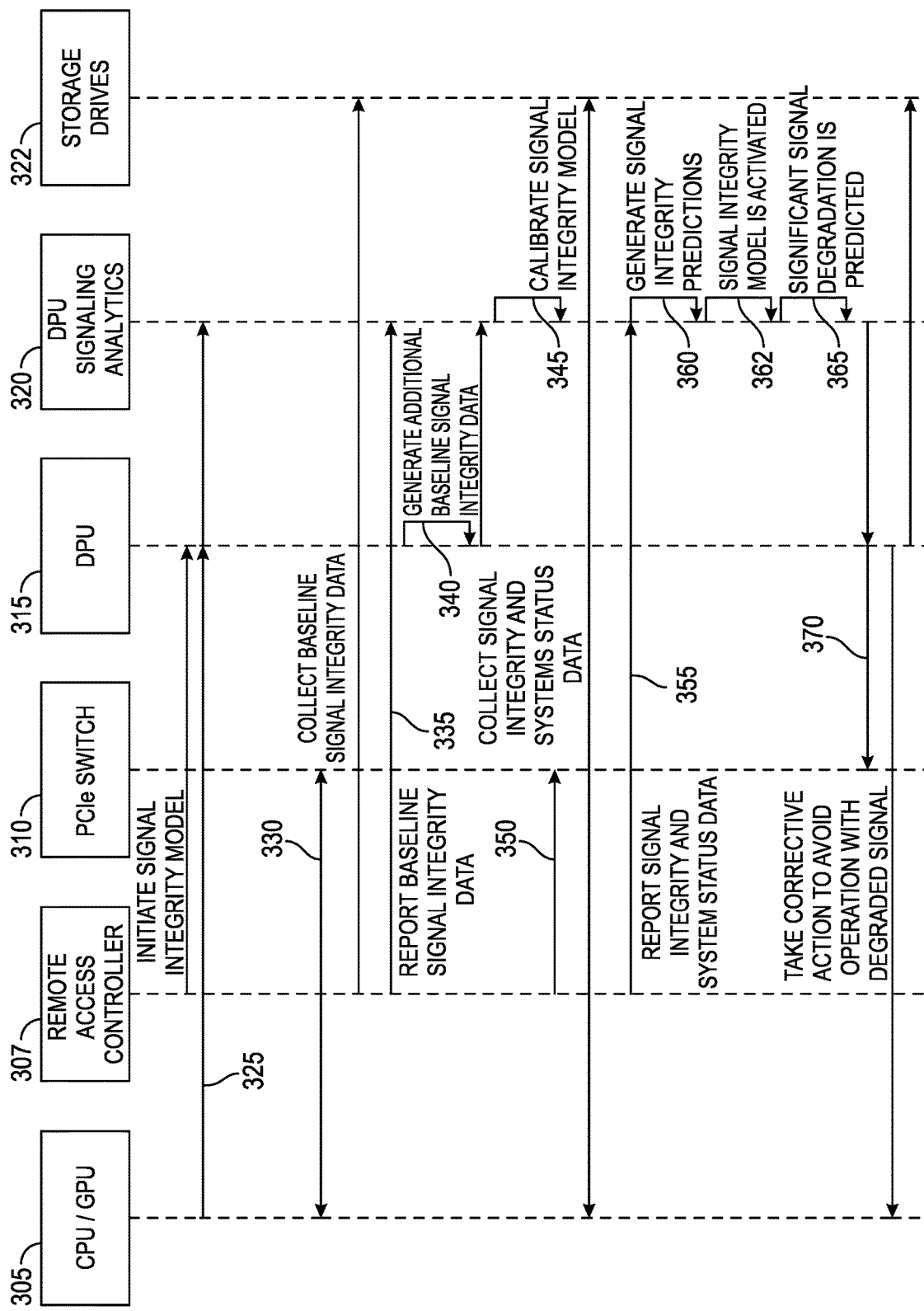
FIG. 3 is a swim lane diagram illustrating certain responsibilities of components of an IHS configured according to certain embodiments for managing signaling integrity in high-speed data links available within the IHS
Figure 4:
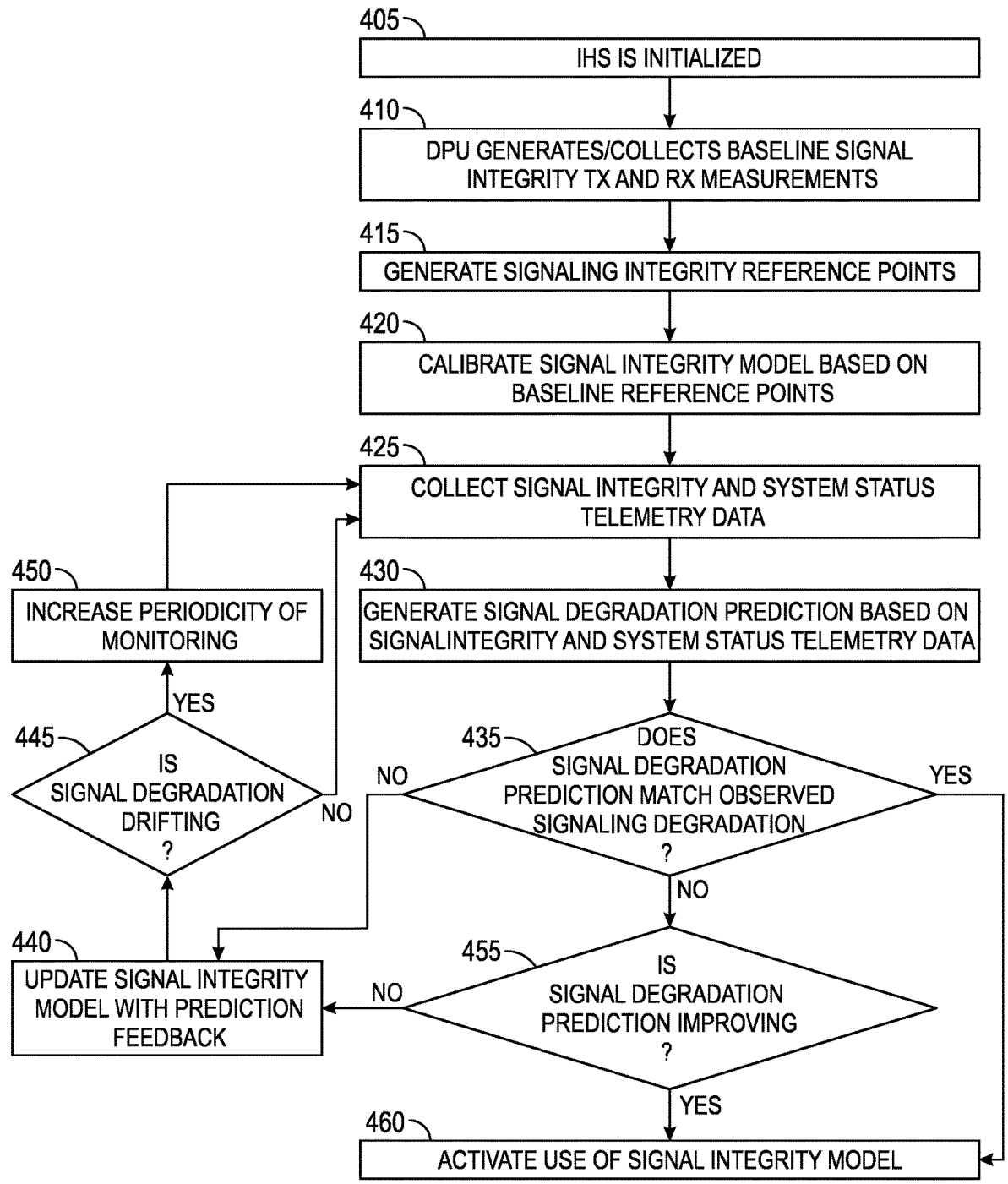
FIG. 4 is a flowchart describing certain steps of a method, according to some embodiments, for managing signaling integrity in high-speed data links available within an IHS.

FIG. 3 is a swim lane diagram illustrating certain responsibilities of components of a system configured according to certain embodiments for managing signaling integrity in high-speed data links available within an IHS. As described with regard to FIG. 2, embodiments may include an IHS that includes one or more CPUs/GPUs 305, remote access controller 307, PCIe switches 310, DPUs 315, which each implement a signaling analytics module 320, and storage drives 322, such as SSD drives that support NVMe connections to DPU 315. FIG. 4 is a flowchart describing certain steps of a method, according to some embodiments, for managing signaling integrity in high-speed data links available within an IHS.

Some embodiments of the method of FIG. 4 may begin, at block 405, with the initialization of an IHS, such as the IHSs described with regard to FIGS. 1 and 2. As described, an IHS may include various high-bandwidth PCIe buses, including PCIe buses connecting a DPU 350 to various other components of an IHS, such as a direct PCIe connection support by the CPUs/GPUs 305 of the IHS. As described, DPU 315 may instead connect with CPUs/GPUs 305 indirectly though a PCIe connection supported by a PCIe switch of the IHS. Once the IHS is initialized, at 325, a DPU 315 initializes the operation of a signaling analytics program 320. As described above, a DPU 315 may include programmable logic components, such as one or more ARM cores, and memory devices capable of storing program instructions and data for used by the logic components. Utilizing these capabilities of DPU 315, the signaling analytics program 320 may be implemented using program instructions that are stored in these memory devices of DPU 315 and that are executed using the processing cores, such as an ARM core, of the DPU 315. As indicated in FIG. 3, the signaling analytics program 320 may be initiated by the DPU 315 based on instructions provided by the remote access controller 307 and/or by CPU/GPU 305. In some embodiments, DPU 315 may initiate the signaling analytics program 320 automatically upon its own initialization, or upon a restart of DPU 315.

Upon initialization of the signaling analytics program 320, at 330 and 410, remote access controller 307 initiates collection of baseline signal integrity information for each of the PCIe connections supported by DPU 315. In some instances, remote access controller 307 may collect baseline signal integrity measurements from any or all managed devices coupled to DPU 315 via a PCIe connection, whether directly or indirectly. Accordingly, remote access controller 307 may collect baseline signal integrity measurements from storage drives 322, PCIe switches 310 and/or CPUs/GPUs 305 that are coupled to DPU 315. In some embodiments, the baseline signal integrity measurements collected by remote access controller 307 may include eye diagrams that illustrate electrical characteristics of PCIe connections with DPU 315, such as a PCIe eye diagram collected from a storage drive 322 that is connected via a PCIe connection with DPU 315. In some instances, other types of baseline PCIe signal integrity data may be collected through sideband management connections by remote access controller 307 through monitoring of registers maintained by the PCIe interfaces used by the PCIe switch 310, DPU 315, CPU/GPU 305 and/or storage drives 322. As indicated in FIG. 3, at 335, any baseline signal integrity measurements collected by remote access controller 307 are transmitted to the signaling analytics program 320.

As illustrated in FIG. 3, in some embodiments, DPU 315 may additionally or alternatively generate its own baseline signal integrity measurements. For instance, the PCIe interface of DPU 315 may be operated to generate eye diagrams or other signal integrity measurements for each transmission and reception PCIe signaling pathway of the PCIe interface. In additional, the signaling analytics program 320 may be configured to monitor registers maintained by the PCIe interface of DPU 315, where these registers may provide indications of signal integrity of the PCIe connections being supported by the PCIe interface. Based on the baseline signal integrity measurements collected by the remote access controller 307 and/or DPU 315, at 415, the signaling analytics program 320 generates one or more reference points for each PCIe connections, where each reference point may specify one or more measurements taken from an image representing a signal propagated on the PCIe connections, such as measurements generated from an eye diagram of each PCIe connection.

Based on the reference points generated from the baseline signal integrity measurements collected by the remote access controller 307 and/or DPU 315, at 345 and 420, the signaling analytics program 320 calibrates the signal integrity model that will be used to predict degradations in the PCIe connections of DPU 315. In some embodiments, the signal integrity model may utilize one or more machine learning algorithms (e.g., neural networks, Bayesian networks, Markov models, etc.) to predict signal degradations, where the predictions are generated based on observed signal integrity conditions and also based on system status information, such as the status of components of the IHS that are connected to the PCIe switch fabric. In some instances, calibration of the signal integrity model may include setting one or more weights or other parameters of the machine learning algorithms in use by the signal integrity model, where the weights are set to reflect the baseline reference point measurements that have been generated for a signal. For example, calibration of a neural network may include setting weights for one or more inputs or internal connections of the neural network, where the weights may be set to reflect a baseline reference point indicating a relatively weak signal in a PCIe connection, possibly due to a long cable length, or due to bend in a cable.

With the signal integrity model calibrated and ready of use, at 350, use of the model may commence with the periodic collection of signal integrity data and IHS status information for use as inputs to the machine learning algorithm(s) in use by the signal integrity model. As described, for each periodic collection of data, the remote access controller 307 may collect measurements of signal strength information for PCIe connections from various PCIe devices, such as storage devices 325, PCIe switch 310 and/or CPU/GPU 305. Remote access controller 307 may also periodically collect various types of system status information for use as inputs to the machine learning algorithm(s) of the signal integrity model. For instance, the detection of a new PCIe device being coupled to PCIe switch may be collected as system status information and used as in input to the signal integrity model, since the addition of a new PCIe device may result in a longer or more complex signaling pathway and thus may result in a change in signal degradation. For instance, use of NVMe to access SSDs over a PCIe connection allows parallel use of a multiple SSDs. This capability allows numerous SSDs to be connected to a PCIe fabric. In a datacenter environment, SSDs may be added to and removed from a rack-mounted IHSs with regularity. Each time an SSD is added or removed from an IHS, PCIe fabric is altered in a manner that could subtly affect signaling properties within the PCIe fabric and could result in small but meaningful changes in signal degradation within the PCIe fabric.

In some instance, the status of a PCIe device, other than its addition or removal, may affect signal degradation. For example, a GPU 260 or SSD storage drive 235*a-b* entering a sleep state may result in a change in the impedance in the PCIe connections used by these devices, and may have subtle effects on the signal integrity of other connections connected on the same PCIe fabric, or within PCIe links sharing the same cabling as the PCIe connection to the device entering the sleep state. Accordingly, at 350, remote access controller 307 may collect system information specifying the addition or removal of a PCIe device or a change in a status of a PCIe device, such as a SSD storage drive 322, by querying the BIOS of the IHS, analyzing logs maintained by the IHS, and based on internal data that is maintained by the remote access controller 307 in support of remote management of the IHS and its internal components. In some instances, remote access controller 307 may utilize sideband device management capabilities in collecting device status information from various managed PCIe devices of the IHS.

In this same manner, the remote access controller 307 may collect various other types of information that may be indicative of signal degradation. For instance, PCIe connections may suffer from signal degradation due to significant changes in temperature along the length of a PCIe cable. In some embodiments, remote access controller 307 may query one or more sensors 225 of the IHS in order to capture relevant temperature data, where the remote access controller 307 may utilize sideband device management capabilities in collecting temperature information from the sensors. As indicated in FIGS. 3, at 355 and 425, the remote access controller 307 reports the collected signal integrity and system status information to the signaling analytics program 320 for use in generating signal degradation predictions. As when generating the baseline signal integrity measurements, at 425, the DPU 315 may also collect signal integrity and system status data that is reported to the signaling analytics program 320 for use in generating signal degradation predictions.

Using the collected signal integrity and system status information, at 360 and 430, the signaling analytics program 320 utilizes the signal integrity model to generate a prediction of signal integrity degradation. As described, the signal integrity model may utilize various types of machine learning algorithms, such as neural networks, to generate predictions of signal degradation in the PCIe connections supported by DPU 315. Accordingly, the collected signal integrity and system status information may be utilized as inputs to a machine learning algorithm used by the signal integrity model, such as inputs to input nodes of a neural network. Based on these inputs, the signal integrity model may generate, at 360 and 432, an output that predicts a level of signal degradation in one or more of the PCIe connections supported by the DPU 315.

As illustrated in FIG. 4, at 435, the prediction generated by the signal integrity model is evaluated against actual signal integrity data in order to assess the accuracy of the generated prediction. For instance, upon generating a signal integrity prediction of a significant decrease in signal integrity, the signaling analytics program 320 may query the remote access controller 307 and/or DPU 315 for signal integrity data that is used to evaluate whether the generated prediction was accurate, or as described below, whether the generated prediction is more accurate than previous predictions generated by the signal integrity model. If the prediction of a degraded signal is not confirmed based on the actual signal integrity, the signaling analytics program 320 does not make any additional attempts to validate the prediction and proceeds, at 440, to update the signal integrity model with feedback regarding the incorrect prediction, where the feedback may be used to adjust the weights used by the neural network machine learning algorithm that is employed by the signal integrity model. This same feedback mechanism may also be used in scenarios where a prediction by the signal integrity model is confirmed as accurate, where the feedback serves to strengthen the association within the machine learning algorithm between the inputs used to generate the confirmed prediction and the prediction itself.

In some instances, the prediction generated by the signal integrity model may have been demonstrated to be incorrect in light of the actual signal integrity, but the actual signal integrity may nonetheless exhibit some indications of degradation. Some embodiments may identify such instances, at 445, through detection of drift in the signal integrity measurements that are collected by the remote access controller 307 and/or DPU 315. With each iteration of the signal integrity model in generating a signal integrity prediction, the signaling analytics program 320 tracks properties of the actual signal degradation measurements that are collected and utilized to evaluate the accuracy of the predictions. Based on this ongoing tracking of signal degradation in each of the PCIe connections supported by DPU 315, the signaling analytics program 320 determines whether the integrity of a signal is drifting towards degradation, even if not in the manner and/or degree that was predicted by the signal integrity model.

In scenarios where such drift in signal integrity is observed, at 450, the signaling analytics program 320 increases the periodicity at which the signal integrity model generates a prediction. Although the prediction made by the signal integrity model is incorrect, the drift in the signal integrity nonetheless suggests that a degradation of signal integrity is forthcoming, thus initiating an increased frequency of the observations and predictions by the signal integrity model. As indicated in FIG. 3, now using the shortened interval between successive signal degradation predictions, at 425, the signaling analytics program 320 returns to the subsequent periodic iteration of collecting signal integrity and system status information for use in driving the next signal degradation prediction by the signal integrity model.

As illustrated in FIG. 3, in scenarios where the prediction made by the signal integrity model is not confirmed as being accurate, at 455, the signaling analytics program 320 may determine whether the predictions made by the signal integrity model are nonetheless improving relative to prior predictions. With each iteration of the signal integrity model in generating a signal integrity prediction, the signaling analytics program 320 tracks the predictions that are made and the accuracy of the predictions in comparison to the actual signal integrity conditions. Using this data, the signaling analytics program 320 identifies scenarios where, despite the predictions made by the signal integrity model being incorrect, these predictions are nonetheless improving. In some embodiments, sufficient improvement over one or more predictions may provide a basis for activation of the signal integrity model. Some embodiments may require multiple improving predictions in order to trigger activation of the signal integrity model and/or predictions that have improved by at least a certain amount.

In this manner, improving predictions by the signal integrity model may be sufficient to activate the signal integrity model. At 460, the signal integrity model may instead be activated in response to a signal integrity prediction that is confirmed as accurate by the signaling analytics program 320. Various tolerances may be applied in affirming the accuracy of predictions by the signal integrity model versus signal integrity data collected by the remote access controller 307 and/or DPU 315. In some embodiments, the confirmation of a single prediction may be deemed sufficient to trigger activation of the signal integrity model. In some embodiments, confirmation of multiple successive predictions may be required to trigger activation of the signal integrity model. One the signal integrity model has been activated, the DPU 315 begins use of the signaling analytics program 320 for monitoring PCIe network conditions and for executing corrective network operations that preemptively avert the occurrence of predicted degradations in signal integrity, thus preserving the use of the maximum possible transmission speeds in PCIe connections supported by the DPU 315.

FIG. 4 is a flowchart describing certain steps of a method, according to some embodiments, for use of an activated signal integrity model for managing the signaling integrity in the PCIe connections supported by the DPU 315. Once activated, at 505 and at 362 of FIG. 3, the signal integrity model is utilized for predicting signal integrity degradations and based on these predictions, to also initiate corrective actions that attempt to avoid the predicted signal integrity degradations and averting any downgrading of the transmission speeds of a PCIe connection. As such, the activated signal integrity model becomes a tool for use by the DPU 315 in proactive management of the PCIe bandwidth that is available in the PCIe interface of the DPU 315. As during the interval of FIG. 4, where the signal integrity model is trained and validated, at 510, the signaling analytics program 320 collects signal integrity measurements from the remote access controller 307 and/or DPU 315, where these measurements may be in the form of various metrics, such as eye diagram measurements, that characterize the signal integrity of one or more of the PCIe connections of the DPU 315. Also as before, at 515, the signaling analytics program 320 collects system status information, such as PCIe device status information collected by DPU 315 and by remote access controller 307, such as from data collected via sideband management connections.

Figure 5:
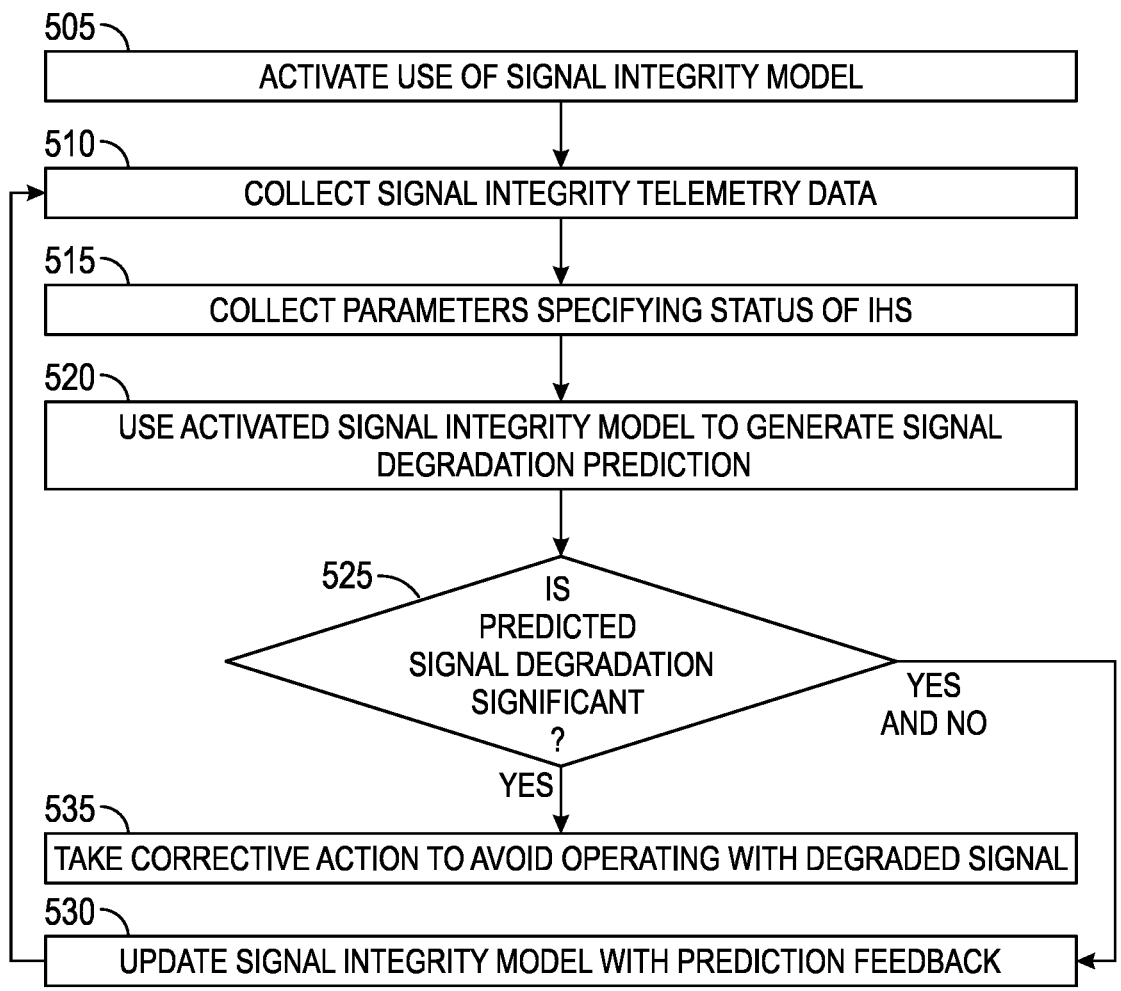
FIG. 5 is a flowchart describing certain steps of an additional method, according to some embodiments, for managing signaling integrity in high-speed data links available within an IHS.

Using the collected signal integrity measurements and the system status information as inputs used to drive the activated machine learning model, at 520, the signal integrity model generates a signal degradation prediction for one or more of the PCIe connections supported by the DPU 315. In instances where the generated prediction does not indicate any signal degradation, or predicts a type or amount of signal degradation that does not warrant corrective action, at 530, the feedback regarding the incorrect or partially correct prediction is used to update the signal integrity model, such as through adaptation of one or more weights of a neural network machine learning algorithm utilized by the signal integrity model. As indicated in FIG. 5, this updating of the signal integrity model is also undertaken in scenarios, at 365 of FIG. 3, where, at 525, the signal integrity model predicts a significant degradation in signal integrity that warrants corrective action.

In situations where a significant degradation in signal integrity is predicted, at 535 and 370, the signaling analytics program 320 initiates a corrective action in an effort to avoid any operations by the DPU 315 while using the predicted signal degradation, and to avert any downgrading of transmission speeds by one of the PCIe connections in use by the DPU 315. Even if the transmission speed can be reverted to a high-speed, if and when the degradation improves, embodiments attempt to preemptively avoid any such downgrading and to maximize PCIe operations using the fastest transmission speeds that can be supported. In some embodiments, a predicted degradation that is significant such that it that it warrants corrective action may be a degradation in signal integrity that will result in a PCIe connection being error prone and/or will trigger downgrading the speed of the PCIe connection. In some embodiments, corrective actions on the one or more PCIe connections for which a significant degradation in signal integrity has been predicted may include initiating a retraining operation on the PCIe connection(s). Through initiation of a retraining operations, the PCIe devices at each end of the PCIe connection negotiate a new connection, where the transmission speed of the retrained connection may be selected based on recalibrated signaling capabilities that are determined based on the current signal integrity conditions. In some cases, the retraining of the connection triggers adaptions to the signaling capabilities of the PCIe interfaces, where the adaptions may serve to avoid negative effects that would otherwise be caused by a degradation in signal integrity. In some embodiments, this retraining of PCIe connections may be initiated based on sideband management connections supported by remote access controller 307 with the DPU 315 and the other PCIe devices of the IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more CPUs utilizing one or more PCIe (Peripheral Component Interconnect Express) buses that connect to a plurality of PCIe devices;
the plurality of PCIe devices;
a data processing unit (DPU) comprising:
one or more DPU processor cores;
a PCIe interface connecting the data processing unit to the one or more CPUs and to one or more of the plurality of PCIe devices;
one or more memory devices storing computer-readable instructions that, upon execution by the one or more DPU processor cores, cause a signaling analytics program to:
upon initialization of the IHS, generate baseline signal integrity measurements;
calibrate a signaling analytics model using the baseline signal integrity measurements;
generate a signal degradation prediction using the signaling analytics model;
when the signal degradation prediction is confirmed, activate use of the signaling analytics model;
utilize the activated signaling analytics model to predict a signaling degradation in a connection supported by the PCIe interface; and
initiate a corrective operation to prevent the predicted signaling degradation.

2. The IHS of claim 1, further comprising a remote access controller configured to collect signal integrity data from one or more of the plurality of PCIe devices, wherein the signal integrity data collected by the remote access controller is used to confirm the signal degradation prediction.

3. The IHS of claim 2, wherein the signal integrity data is collected from the one or more PCIe devices using sideband management connections between the remote access controller and the one or more PCIe devices.

4. The IHS of claim 2, wherein the signaling analytics model is also activated when the signal degradation prediction is improving relative to prior predictions and the signal integrity data collected by the remote access controller indicates a drift in signal integrity.

5. The IHS of claim 4, wherein the drift in signal integrity is measured based on detected drift in an eye chart of a signal supported by the PCIe interface.

6. The IHS of claim 1, wherein the corrective operation initiated to prevent the predicted signaling degradation comprises initiating a retraining of the signal supported by the PCIe interface.

7. The IHS of claim 1, wherein the predicted signaling degradation comprises a degradation caused by a state change by a first of the PCIe devices of the IHS.

8. The IHS of claim 7, wherein the first PCIe device coupled to the IHS comprises an SSD (Solid State Drive).

9. The IHS of claim 8, wherein the predicted signaling degradation is caused by the SSD entering a sleep state.

10. The IHS of claim 1, wherein the IHS further comprises a PCIe switch connecting the DPU to the one or more CPUs, wherein the signal degradation prediction is confirmed based on signal integrity data collected by the PCIe switch.

11. The IHS of claim 1, wherein corrective operation is initiated by the PCIe interface.

12. The IHS of claim 3, wherein the corrective operation is initiated using the sideband management connections between the remote access controller and the one or more PCIe devices.

13. A method for management of PCIe (Peripheral Component Interconnect Express) bandwidth of a DPU (Data Processing Unit) of an IHS (Information Handling System), the method comprising:
upon initialization of the IHS, generating baseline signal integrity measurements of one or more connections supported a PCIe interface of the DPU;
calibrating a signaling analytics model using the baseline signal integrity measurements;
generating a signal degradation prediction using the signaling analytics model;
when the signal degradation prediction is confirmed, activating use of the signaling analytics model;
utilizing the activated signaling analytics model to predict a signaling degradation in a connection supported by the PCIe interface of the DPU; and
initiating a corrective operation to prevent the predicted signaling degradation.

14. The method of claim 13, wherein the signaling analytics model is also activated when the signal degradation prediction is improving relative to prior predictions and collected signal integrity data indicates a drift in signal integrity.

15. The method of claim 14, wherein the drift is detected based on a detected drift in an eye chart of a signal supported by the PCIe interface.

16. The method of claim 13, wherein the prediction is confirmed based on an eye chart of a signal supported by the PCIe interface.

17. The method of claim 13, wherein the predicted signaling degradation comprises a degradation caused by a change to a PCIe device coupled to the IHS.

18. A non-transitory computer-readable storage device of a DPU (data processing unit) having instructions stored thereon for management of PCIe (Peripheral Component Interconnect Express) bandwidth of an IHS (Information Hand ling System) in which the DPU is installed, wherein execution of the instructions by one or more processors of the DPU causes the processors of the DPU to:

upon initialization of the IHS, generate baseline signal integrity measurements of one or more connections supported a PCIe interface of the DPU;

calibrate a signaling analytics model using the baseline signal integrity measurements;

generate a signal degradation prediction using the signaling analytics model;

when the signal degradation prediction is confirmed, activate use of the signaling analytics model;

utilize the activated signaling analytics model to predict a signaling degradation in a connection supported by the PCIe interface of the DPU; and initiate a corrective operation to prevent the predicted signaling degradation.

19. The DPU storage device of claim 18, wherein the signaling analytics model is also activated when the signal degradation prediction is improving relative to prior predictions and collected signal integrity data indicates a drift in signal integrity.

20. The DPU storage device of claim 18, wherein the predicted signaling degradation comprises a degradation caused by a change to a PCIe device coupled to the IHS.

* * * * *